United States Patent
Butler

[15] 3,669,898

[45] June 13, 1972

[54] FOAM PROTECTION OF PLANT LIFE

[72] Inventor: James W. Butler, Stittsville, Ontario, Canada

[73] Assignee: Laurentian Concentrates Limited, Ontario, Canada

[22] Filed: Feb. 7, 1969

[21] Appl. No.: 797,689

[30] Foreign Application Priority Data

Dec. 12, 1968 Canada ................................. 037,610

[52] U.S. Cl. .................................. 252/307, 47/2, 252/350, 239/2
[51] Int. Cl. .......................................... A01g 13/00
[58] Field of Search ............................. 252/3, 307, 350; 47/2

[56] References Cited

UNITED STATES PATENTS

| | | | |
|---|---|---|---|
| 2,324,951 | 7/1943 | Ratzer | 252/307 |
| 2,413,667 | 12/1946 | Urquhart | 252/307 |
| 2,433,625 | 12/1947 | Raspet | 252/307 |
| 2,875,555 | 3/1959 | Theigs et al | 252/3 |
| 2,958,658 | 11/1960 | McIntosh | 252/3 |

*Primary Examiner*—John D. Welsh
*Attorney*—Fetherstonhaugh & Co.

[57] ABSTRACT

There is described a foam concentrate from which foams to be used to protect vegetation, for example from frost can be produced. The concentrate comprises a neutralized protein hydrolysate stabilized with specified proportions of iron and lignosulfonate. A method of protecting vegetation using the above foams is also described.

17 Claims, No Drawings

FOAM PROTECTION OF PLANT LIFE

BACKGROUND OF THE INVENTION

1. Field of the Invention

This invention relates to concentrates to be used in the production of foams and to a method of protecting vegetation using foams.

2. Prior Art

The use of foams to protect crops is known but it has not come into general use. The principle problem has been to produce a foam that is stable for a sufficient period.

For such a foam to be effective it must be present on the vegetation when frost occurs. It must be in a condition capable of offering protection from the frost, and must retain this condition throughout the critical frost period. Following the frost period the foam must be readily dispersable either by natural means (sun and wind) or by available mechanical means (agitation, water spray or airjet). In practice the foam could be applied immediately following a frost warning. Such a warning may be 12 hours before the frost so that foam application may take place at midday. The foam is then expected to offer protection until sun rise the next day. This early foam application becomes obligatory when the acreage to be covered is large. Thus the foam should be stable for at least 18 hours, in spite of the fact that for smaller applications a life of as little as 4 hours would suffice. This 18 hours minimum life should be possible not only in the dark, still, cold atmospheric conditions associated with frost onset but also in the variable daytime atmospheric conditions likely to be present immediately before frost onset in spring or fall.

A foam to be used for frost protection should also have structural strength. If applied to vegetation in the form of a row crop in spring or fall, a wide swath, a bush or hedge, a branch or a tree, the blanket must bridge reasonable gaps without collapse. Furthermore it should retain this strength without dimensional alteration throughout the critical period. Since a foam represents air bubbles surrounded by an aqueous solution it is evident that any loss of the aqueous solution must lead to a weakening of the bubble walls and thus the foam itself. It is therefore imperative that loss of liquid by drainage should be minimal or nil. Loss of liquid by evaporation should be reduced or stopped by the surface characteristics of the foam or possibly by the application of a water vapor retaining coating to the foam.

Any foam to be used for frost protection must be entirely nontoxic and without deleterious effect on the development of the vegetation. A foam should not reduce pollination, fruit set or development, yield, quality, or leaf production. Rather the reverse is to be hoped for. Further, any remains of foam left on ripe fruit should be completely harmless if eaten.

Foams are extensively used in fire fighting. Most foam concentrates used to produce firefighting foams use protein hydrolysates to obtain the required fire resistance and strength in the final foam. These protein hydrolysates are produced by the action of, for example, the hydroxides of sodium or calcium in aqueous solution on a variety of proteins, for example, blood, feather meal, hoof and horn meal, fish meal and oil seed cakes, at either atmospheric or elevated pressures. Following hydrolysis the clear solution is neutralized and if necessary concentrated. At some stage in this process the foam composition is stabilized. Virtually all modern foam compounds contain salts of ferrous iron to effect stabilization although other metals are occasionally used for specific purposes. The extent of stabilization is limited by the insolubility of the protein-iron complexes formed upon over-stabilization. In general it may be said that the maximum amount of iron (as Fe) is about 10 percent of the protein nitrogen present (as N).

It is known that protein based fire-fighting concentrates can include soluble lignosulfonates. These lignosulfonates worsen the fire-fighting properties of the foam produced from the concentrate and add little worthwhile to the other properties of the foam.

SUMMARY OF THE INVENTION

The present invention provides a foam concentrate from which foams suitable for the protection of crops can be formed.

The present invention provides a foam concentrate that comprises a neutralized protein hydrolysate containing a stabilizer (a) sufficient ferrous salt to provide 20 to 100 parts of iron per 100 parts of protein nitrogen and (b) sufficient of a lignosulfonate to provide 100 to 1000 parts of lignosulfonate, measured as dry salt, per 100 parts of protein nitrogen, all parts being by weight.

Commercially obtainable lignosulfonates may be used but those of sodium or ammonium are preferred.

The neutralized protein hydrolysate used may be of any of those used to produce fire-fighting foams.

The addition of gelatin wholly or partly to replace the lignosulfonate gives a concentrate capable of producing a fairly satisfactory foam. The gelatin is preferably present in a partially alkaline hydrolyzed form.

Ferrous compounds that may be used include any ferrous compound that is not toxic to the plants to be protected. Ferrous sulfate and ferrous chloride have proved useful.

The preferred ratio of protein nitrogen:iron:lignosulfonate is 100:50:250. Outside the preferred range, variations can lead to undesirable features, for example reduced expandibility, less desirable surface characteristices, and less bubble wall strength but we have also found that the nature of the protein used to form the concentrate and which could have varied considerably in its initial processing can lead to a change in the ratio chosen in order to achieve optimum foam conditions.

The pH of the concentrate is reasonably important. A high pH can assist in the production of a clear concentrate but the diluted concentrate suffers severely since foam production is reduced. Low pH offer no improvement and tend to render the compound unstable. pH $7 \pm 0.5$ is the optimum.

The production of a foam from the above concentrate may be by any technique capable of producing the desired foam. A technique that has proved useful is to pass diluted concentrate and compressed air in appropriate proportions and at a pressure of about 10 lbs per square inch through a conventional mixing device, for example a tube packed with gauze. A preferred dilution of the concentrate is to a solution containing 0.15 percent w/v protein nitrogen. However solutions containing between 0.1 percent and 0.3 percent w/v protein nitrogen can give almost equally good results. For reasons of economy and in order to achieve structural strength it is desirable to incorporate the maximum volume of air into the foam in the form of minute discrete bubbles. Generally the optimum is 29 parts of air to 1 part diluted concentrate, i.e., an expansion of 30, with variations governed solely by structural foam strength at the low level and by unmanageability at the high level. Generally this represents expansions of 25 and 45 respectively although these values can be exceeded when circumstances warrant.

An improved foam may be produced if a soluble calcium salt is present in the diluted concentrate. The improvement takes the form of enabling a stiffer foam to be made whose surface characteristics are improved greatly by virtue of a layer of glazed foam. We have not been able to introduce the calcium into the concentrate because of the gross deterioration and eventual sludging that this produces. But calcium may readily be introduced into the dilute working solution and there effect its improvement.

Excess iron, over and above that acceptable in the concentrate, may be introduced into the diluted concentrate. If preferred all the iron may be introduced into the diluted concentrate rather than in the concentrate, without losing any of its effectiveness.

Expansion improvers common to the foam producing art may be introduced if necessary to ensure the production of the desired expansion from the concentrate.

The present invention also provides a method of protecting vegetation especially from frost, that comprises applying to the vegetation a foam produced by the above process. Foams made by the above process have a frost protection life far in excess of foam made from the original protein based concentrate, or from the concentrate plus the iron additions with no addition of lignosulfonate or from the concentrate plus the lignosulfonate with no addition of iron. We have shown in fact that within definable limits the concentrates produced by this means can produce a unique foam that is plastic, cohesive and adhesive when produced. Within a short time, normally ½ - 2 minutes, the foam "Sets up," adopts a short consistency and in this form can shear, although plant movement or wind does not achieve this unless grossly excessive. Foams produced using expansions greater than 25 do not lose, by gravitational losses, any of the liquid from which they were made, sole losses of liquid being by evaporation or by contact with a bibulous substrate. This is exceptional if not unique. Furthermore the surface of the foam tends to glaze and thereby restrict evaporation, although full summer sun, which is seldom met under frost conditions, can overrule this effect and result in an increased evaporation loss. Natural destruction of the foam is a function of sunlight, sun heat, low humidity and wind. If none of these are present the life of the foam is greatly increased. Destruction and dispersal of the foam is by drying by evaporation from the outer surface and the blowing away of the dried layers or patches.

There are practical limits to the thickness of foam blanket required. Thus although the insulation properties of the foam are adequate enough to permit a thinner blanket, the weakening of the foam surface due to evaporation from the surface indicates a minimum blanket thickness of one inch. At the other extreme blankets over three inches in thickness are too long lasting. Both these limits are approximate for normal spring or fall atmospheric conditions.

Successive foam layers on tomatoes and on strawberries, both sensitive plants, have resulted in no harm whatsoever to the plants, or to their development and fruit forming or yielding properties even with as many as nine applications over a four week period in spring. Official confirmation that in the amounts that foam residues are likely to remain on ripe fruit there is no health hazard whatsoever has been received.

The invention will be described further in the following examples.

The concentrates used in the following Examples are prepared by appropriate dilution and addition of stabilizers according to the invention to a protein hydrolysate prepared in the following manner:

Seven gallons of water were heated to 95° C with 9 lbs. of Slaked Lime added and continually stirred, followed by the addition of 23 lbs. Hoof and Horn Meal. The temperature was brought up to 92°–95° C and held for 5 hours.

The mixture was filtered and the filtrate passed to vegetation stirred vessel where the pH was brought up to 7.0. The mixture was filtered again.

The filtrate was concentrated by boiling to a Protein Nitrogen content of 5.0 percent.

The skilled man will appreciate the above hydrolysate is prepared in a normal manner for the art. The hydrolysate can be replaced by any of the equivalent hydrolysates that are commercially available.

Example 1

A concentrate containing 2.8 percent protein nitrogen, 1.2 percent iron (added as ferrous sulfate) and 7 percent sodium lignosulfonate was used at a 6 percent dilution to form foams having expansions of 20, 25, 30, 40 and 50. These foams were applied by a hand applicator to 100 ft. rows of Fall field tomatoes to give a 2 to 3 inch cover. The foams were applied at 5 p.m. At 10 a.m. the next morning all foam covers were still effective except where tall stems had broken through. Visually the lowest expansions (20) was inferior in comparison with the others.

Example 2

The same solution as in Example 1 was used at 6 percent dilution and at expansions 25, 30 and 40, hand applied to the same rows of tomatoes at 3 p.m. to a thickness of 2 to 3 inches. The cover completely protected the plants and fruit against a temperature of 23° F (5 inches from ground level) except where tall stems broke through the cover. Control plants without foam cover were completely destroyed.

Example 3

A series of tests were run using 5 percent and 6 percent solutions of concentrates containing 2.4 to 3.3 percent nitrogen, 1.0 to 1.6 percent iron (added as ferrous sulfate) and 5 to 10 percent lignosulfonate made into foams of expansion 25 to 35. These foams were applied mechanically by a tractor drawn device to blanket tomatoes and strawberry beds to a depth of 1 to 2 inches. The cover so obtained remained viable for at least 18 hours except where tough weed stems broke through the cover.

The following example relate to laboratory investigational work designed primarily to determine foam life under standard conditions. The foam in all these examples has been produced from a small foam-making branchpipe using a premixed solution. The foam was set out in the open, on gravel, in the form of a 3 inch thick layer and observations made on its behavior.

Example 4

A concentrate containing 2.8 percent protein nitrogen, 1.35 percent iron (added as ferrous sulfate) and 8 percent sodium lignosulfonate was used in solutions containing 0.056 percent, 0.112 percent and 0.168 percent nitrogen. The stiffness of the foams varied directly with the strength of the solutions. Foam from the weakest solution set out in sunny conditions lasted about 12 hours where as from the other two solutions the foam was in good condition after 24 hours.

Example 5

A series of concentrates with 2.8 percent protein nitrogen, 1.25 percent iron (added as ferrous sulfate) and with sodium lignosulfonate between 2.8 percent and 8.4 percent were used as 5 percent solutions to produce foams. All these foams were in good condition after 24 hours in sunny dry conditions. As made the foams varied, becoming less stiff as the lignosulfonate content increased. The concentrates showed no precipitation at levels of lignosulfonate at or above 4.2 percent.

Example 6

A series of concentrates with 2.9 percent protein nitrogen 7.5 ammonium lignosulfonate and with iron (added as ferrous sulfate) varying from 0.85 percent to 1.6 percent were used at 6 percent solutions to produce foams. At least 1.1 percent iron was shown to be required to ensure a 24 hour active life for the foam but 1.6 percent iron was shown to be in excess for this formulation since a sludge was developed in the concentrate.

In all the above Examples ferrous chloride or any other ferrous compound that does not contain parts injurious to plants or animals could replace the ferrous sulphate.

What I claim as my invention is:

1. A foam concentrate consisting essentially of a neutralized, protein hydrolysate, containing as a stabilizer (a) sufficient water-soluble ferrous salt non-toxic to plants to provide 20 to 100 parts of iron per 100 parts of protein nitrogen and (b) sufficient of sodium, calcium or ammonium lignosulfonate to provide 100 to 1000 parts of lignosulfonate, measured as dry salt, per 100 parts of protein nitrogen, all parts being by weight, the pH of the concentrate being about 7.

2. A concentrate as claimed in claim 1 in which the source of neutralized protein hydrolysate is blood, horn, feathers or oil seed cake.

3. A concentrate as claimed in claim 1 in which the ferrous compound is ferrous sulfate.

4. A concentrate as claimed in claim 1 in which the ratio of protein nitrogen:iron:lignosulfonate is 100:50:250.

5. A concentrate as claimed in claim 1 in which the lignosulfate is wholly or partially replaced by gelatin.

6. A concentrate as claimed in claim 5 in which the gelatin is in a partially alkaline hydrolyzed form.

7. A concentrate as claimed in claim 1 in which the pH of the concentrate is 7 ± 0.5.

8. In a method of protecting vegetation comprising applying to the vegetation a foam produced from a diluted foam concentrate, the improvement that comprises using as the concentrate a neutralized protein hydrolysate containing as a stabilizer (a) sufficient water-soluble ferrous salt non-toxic to plants to provide 20 to 100 parts of iron per 100 parts of protein nitrogen and (b) sufficient of a lignosulfonate to provide 100 to 1,000 parts of lignosulfonate, measured as dry salt, per 100 parts of protein nitrogen, all parts being by weight.

9. A process as claimed in claim 8 in which the applied foam has a thickness in the range of 1 to 3 inches.

10. A process as claimed in claim 8 in which the diluted concentrate contains between 0.1 percent and 0.3 percent weight w/v protein nitrogen.

11. A process as claimed in claim 10 in which the diluted protein concentrate contains 0.15 percent w/v protein nitrogen.

12. A process as claimed in claim 8 in which the foam is produced by blowing a gas through the diluted foam concentrate.

13. A process as claimed in claim 12 in which the gas is air.

14. A process as claimed in claim 12 in which 29 parts of gas per 1 part of dilute concentrate are used.

15. A process as claimed in claim 8 in which the diluted foam concentrate also contains calcium.

16. A process as claimed in claim 8 in which the structural strength of the foam is such that the foam does not shear when in position on the vegetation under normal spring and fall conditions under which frost may be expected.

17. A process as claimed in claim 8 in which the foams produced using expansions greater than 25 do not lose by gravitational losses any of the liquid from which they were made, sole losses of liquid being by evaporation or by contact with a bibulous substrate.

* * * * *